US009985579B2

(12) United States Patent
Warin

(10) Patent No.: US 9,985,579 B2
(45) Date of Patent: May 29, 2018

(54) MOUNTING ASSEMBLY FOR MOUNTING A SOLAR PANEL

(71) Applicant: Preformed Line Products Co., Mayfield Village, OH (US)

(72) Inventor: Nicholas Warin, Albuquerque, NM (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days. days.

(21) Appl. No.: 15/096,569

(22) Filed: Apr. 12, 2016

(65) Prior Publication Data

US 2017/0294868 A1    Oct. 12, 2017

(51) Int. Cl.
*A47B 97/00* (2006.01)
*H02S 20/30* (2014.01)
*F16M 13/02* (2006.01)

(52) U.S. Cl.
CPC ........... *H02S 20/30* (2014.12); *F16M 13/022* (2013.01); *F16M 2200/024* (2013.01)

(58) Field of Classification Search
CPC .................................. H02S 20/23; E04B 1/40
See application file for complete search history.

(56) References Cited

U.S. PATENT DOCUMENTS

| 7,758,011 | B2 * | 7/2010 | Haddock | ............. | E04F 13/0821 |
| | | | | | 248/500 |
| 7,935,202 | B2 | 5/2011 | Stanley | | |
| 8,146,299 | B2 | 4/2012 | Stearns et al. | | |
| 8,151,522 | B2 | 4/2012 | Stearns et al. | | |
| 8,153,700 | B2 | 4/2012 | Stearns et al. | | |
| 8,166,713 | B2 | 5/2012 | Stearns et al. | | |
| 8,177,180 | B2 | 5/2012 | Plaisted et al. | | |
| 8,181,398 | B2 | 5/2012 | Stearns et al. | | |
| 8,209,914 | B2 | 7/2012 | Stearns et al. | | |
| 8,225,557 | B2 | 7/2012 | Stearns et al. | | |
| 8,245,454 | B2 | 8/2012 | Stearns et al. | | |
| 8,272,172 | B2 | 9/2012 | Li | | |
| 8,272,174 | B2 | 9/2012 | Stearns et al. | | |
| 8,314,088 | B2 | 11/2012 | Sasaki et al. | | |
| 8,318,722 | B2 | 11/2012 | Sasaki et al. | | |

(Continued)

OTHER PUBLICATIONS

Int. Search Report/Written Opinion cited in PCT Application No. PCT/US2017/027114 dated Sep. 11, 2017, 13 pgs.

*Primary Examiner* — Amy J. Sterling
(74) *Attorney, Agent, or Firm* — Cooper Legal Group, LLC

(57) ABSTRACT

A mounting assembly for mounting a solar panel to a surface includes a mounting base. The mounting base supports a fastener. A module mount has a module mount sidewall supporting the fastener. The module mount is movable with respect to the fastener when the fastener is received through the module mount opening. A first distance between a bottom surface of the module mount and a top surface of the mounting base is adjustable. A mounting clamp has a mounting clamp sidewall defining a mounting clamp opening through which the fastener is received. The mounting clamp is movable with respect to the fastener when the fastener is received through the mounting clamp opening such that a second distance between a bottom surface of the mounting clamp and a top surface of the module mount is adjustable. The solar panel is mounted between the mounting clamp and the module mount.

20 Claims, 7 Drawing Sheets

(56) References Cited

U.S. PATENT DOCUMENTS

| | | |
|---|---|---|
| 8,324,400 B2 | 12/2012 | Toppare et al. |
| 8,379,925 B2 | 2/2013 | Schilling et al. |
| 8,383,207 B2 | 2/2013 | Falbaum et al. |
| 8,410,248 B2 | 4/2013 | Rosen et al. |
| 8,413,388 B2 | 4/2013 | Stearns et al. |
| 8,424,821 B2 | 4/2013 | Liu |
| 8,448,407 B1 | 5/2013 | Wiener |
| 8,449,663 B2 | 5/2013 | Smith |
| 8,499,524 B2 | 8/2013 | Stanley |
| 8,513,179 B2 | 8/2013 | Miralles et al. |
| 8,524,029 B2 | 9/2013 | Stanley |
| 8,527,372 B2 | 9/2013 | Sanville et al. |
| 8,557,070 B2 | 10/2013 | Stanley |
| 8,557,145 B2 | 10/2013 | Lee et al. |
| 8,581,241 B2 | 11/2013 | Iida et al. |
| 8,608,884 B2 | 12/2013 | Stanley |
| 8,623,158 B2 | 1/2014 | Stanley |
| 8,624,106 B2 | 1/2014 | Kang et al. |
| 8,627,617 B2 | 1/2014 | Haddock et al. |
| 8,631,629 B1 | 1/2014 | Wiener |
| 8,635,818 B2 | 1/2014 | Wildes |
| 8,652,653 B2 | 2/2014 | Lin et al. |
| 8,683,751 B2 | 4/2014 | Stearns |
| 8,692,234 B2 | 4/2014 | Iida et al. |
| 8,701,354 B2 | 4/2014 | Stearns et al. |
| 8,703,010 B2 | 4/2014 | Okoshi et al. |
| 8,710,791 B2 | 4/2014 | Gochenaur |
| 8,752,338 B2 | 6/2014 | Schaefer et al. |
| 8,756,870 B2 | 6/2014 | Teller et al. |
| 8,756,881 B2 | 6/2014 | West et al. |
| 8,771,652 B2 | 7/2014 | Labuda et al. |
| 8,782,983 B2 | 7/2014 | Stearns |
| 8,796,410 B2 | 8/2014 | Sugo et al. |
| 8,806,815 B1 | 8/2014 | Liu et al. |
| 8,813,441 B2 | 8/2014 | Rizzo |
| D713,784 S | 9/2014 | Wildes |
| 8,821,599 B2 | 9/2014 | Perkins et al. |
| 8,826,618 B2 | 9/2014 | Stearns |
| 8,839,575 B1 | 9/2014 | Liu et al. |
| 8,844,215 B2 | 9/2014 | Wildes et al. |
| 8,847,141 B2 | 9/2014 | Fukuzaki et al. |
| 8,869,471 B2 | 10/2014 | Wildes et al. |
| 8,875,455 B1 | 11/2014 | Yang et al. |
| D718,703 S | 12/2014 | Rizzo |
| D718,704 S | 12/2014 | Rizzo |
| 8,850,754 B2 | 12/2014 | Rizzo |
| 8,898,971 B2 | 12/2014 | West et al. |
| 8,919,052 B2 | 12/2014 | West |
| 8,919,053 B2 | 12/2014 | West |
| 8,935,893 B2 | 1/2015 | Liu et al. |
| 8,946,540 B1 | 2/2015 | West et al. |
| 8,946,682 B2 | 2/2015 | Goel et al. |
| 8,955,259 B2 | 2/2015 | Hemingway |
| 8,957,302 B1 | 2/2015 | Seery et al. |
| 8,984,819 B1 | 3/2015 | Yang et al. |
| 8,986,662 B2 | 3/2015 | Wagner et al. |
| 8,991,114 B2 | 3/2015 | West |
| 9,003,672 B2 | 4/2015 | Lozano, IV |
| 9,003,729 B2 | 4/2015 | West et al. |
| 9,010,041 B2 | 4/2015 | Danning |
| 9,011,034 B2 | 4/2015 | Liu et al. |
| 9,028,977 B2 | 5/2015 | Bae et al. |
| 9,029,558 B2 | 5/2015 | Osaka et al. |
| 9,051,274 B2 | 6/2015 | Osaka et al. |
| 9,057,545 B2 | 6/2015 | Stapleton |
| 9,062,897 B2 | 6/2015 | West et al. |
| 9,068,339 B2 | 6/2015 | Schaefer et al. |
| 9,076,899 B2 | 7/2015 | Schrock |
| 9,080,017 B2 | 7/2015 | Yamanaka et al. |
| 9,080,792 B2 | 7/2015 | Patton et al. |
| 9,087,642 B2 | 7/2015 | Tani et al. |
| 9,097,441 B2 | 8/2015 | West et al. |
| 9,103,567 B2 | 8/2015 | Dwyer et al. |
| 9,106,023 B2 | 8/2015 | Schaefer et al. |
| 9,115,139 B2 | 8/2015 | Sasaki et al. |
| 9,121,180 B2 | 9/2015 | Stanley |
| 9,121,545 B2 | 9/2015 | Stanley |
| 9,127,464 B2 | 9/2015 | Stearns et al. |
| 9,134,044 B2 | 9/2015 | Stearns et al. |
| 9,145,685 B2 | 9/2015 | Stapleton |
| 9,151,315 B2 | 10/2015 | McPheeters |
| 9,190,618 B2 | 11/2015 | Bae et al. |
| 9,196,545 B2 | 11/2015 | Bae et al. |
| 9,200,196 B2 | 12/2015 | Bae et al. |
| 9,212,833 B2 | 12/2015 | Stearns et al. |
| 9,216,813 B2 | 12/2015 | Bright et al. |
| 9,320,931 B2 | 4/2016 | Nedwed et al. |
| 9,324,948 B2 | 4/2016 | Kang et al. |
| 2013/0125492 A1* | 5/2013 | Molek .................. F24J 2/5211 52/489.1 |
| 2015/0102194 A1 | 4/2015 | Liu |
| 2015/0129517 A1 | 5/2015 | Wildes |
| 2015/0280638 A1 | 10/2015 | Stephan et al. |
| 2015/0288320 A1 | 10/2015 | Stearns et al. |
| 2015/0316292 A1 | 11/2015 | West |

\* cited by examiner

MOUNTING ASSEMBLY FOR MOUNTING A SOLAR PANEL

TECHNICAL FIELD

The instant application is directed towards a mounting assembly. For example, the instant application is directed towards a mounting assembly for mounting a solar panel to a surface.

BACKGROUND

Mounting assemblies may be used to mount one or more structures. Mounting assemblies may be used, for example, to mount a solar panel to a surface.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a mounting assembly for mounting a solar panel to a surface is provided. The mounting assembly comprises a mounting base configured to be coupled to the surface. The mounting base is configured to support a fastener that extends along a fastener axis. The mounting assembly comprises a module mount having a module mount sidewall defining a module mount opening through which the fastener is received. The module mount is configured to be movable with respect to the fastener along the fastener axis when the fastener is received through the module mount opening such that a first distance between a bottom surface of the module mount and a top surface of the mounting base is adjustable. The mounting assembly comprises a mounting clamp having a mounting clamp sidewall defining a mounting clamp opening through which the fastener is received. The mounting clamp is configured to be movable with respect to the fastener along the fastener axis when the fastener is received through the mounting clamp opening such that a second distance between a bottom surface of the mounting clamp and a top surface of the module mount is adjustable. The solar panel is mounted between the bottom surface of the mounting clamp and the top surface of the module mount.

In an example, a mounting assembly for mounting a solar panel to a surface is provided. The mounting assembly comprises a mounting base configured to be coupled to the surface. The mounting base has a mounting base sidewall defining a mounting base channel extending along a mounting base channel axis. The mounting base is configured to receive a fastener within the mounting base channel. The fastener is movable within the mounting base channel along the mounting base channel axis. A module mount has a module mount sidewall defining a module mount opening through which the fastener is received. The module mount is configured to be movable with respect to the fastener along the fastener axis when the fastener is received through the module mount opening such that a first distance between a bottom surface of the module mount and a top surface of the mounting base is adjustable. A mounting clamp has a mounting clamp sidewall defining a mounting clamp opening through which the fastener is received. The mounting clamp is configured to be movable with respect to the fastener along the fastener axis when the fastener is received through the mounting clamp opening such that a second distance between a bottom surface of the mounting clamp and a top surface of the module mount is adjustable. The solar panel is mounted between the bottom surface of the mounting clamp and the top surface of the module mount.

In an example, a mounting assembly for mounting a solar panel to a surface is provided. The mounting assembly comprises a mounting base configured to be coupled to the surface. The mounting base is configured to support a fastener that extends along a fastener axis. A module mount has a first module mount sidewall defining a module mount opening through which the fastener is received. The module mount is configured to be movable with respect to the fastener along the fastener axis when the fastener is received through the module mount opening such that a first distance between a bottom surface of the module mount and a top surface of the mounting base is adjustable. The module mount has a second module mount sidewall defining a locking opening extending along a locking opening axis that is substantially parallel to the fastener axis. A mounting clamp has a mounting clamp sidewall defining a mounting clamp opening through which the fastener is received. The mounting clamp is configured to be movable with respect to the fastener along the fastener axis when the fastener is received through the mounting clamp opening such that a second distance between a bottom surface of the mounting clamp and a top surface of the module mount is adjustable. The solar panel is mounted between the bottom surface of the mounting clamp and the top surface of the module mount. A locking structure is configured to be received through the locking opening of the module mount. The locking structure is configured to be coupled to the mounting base to inhibit rotation of the module mount with respect to the mounting base.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

Figure 1:
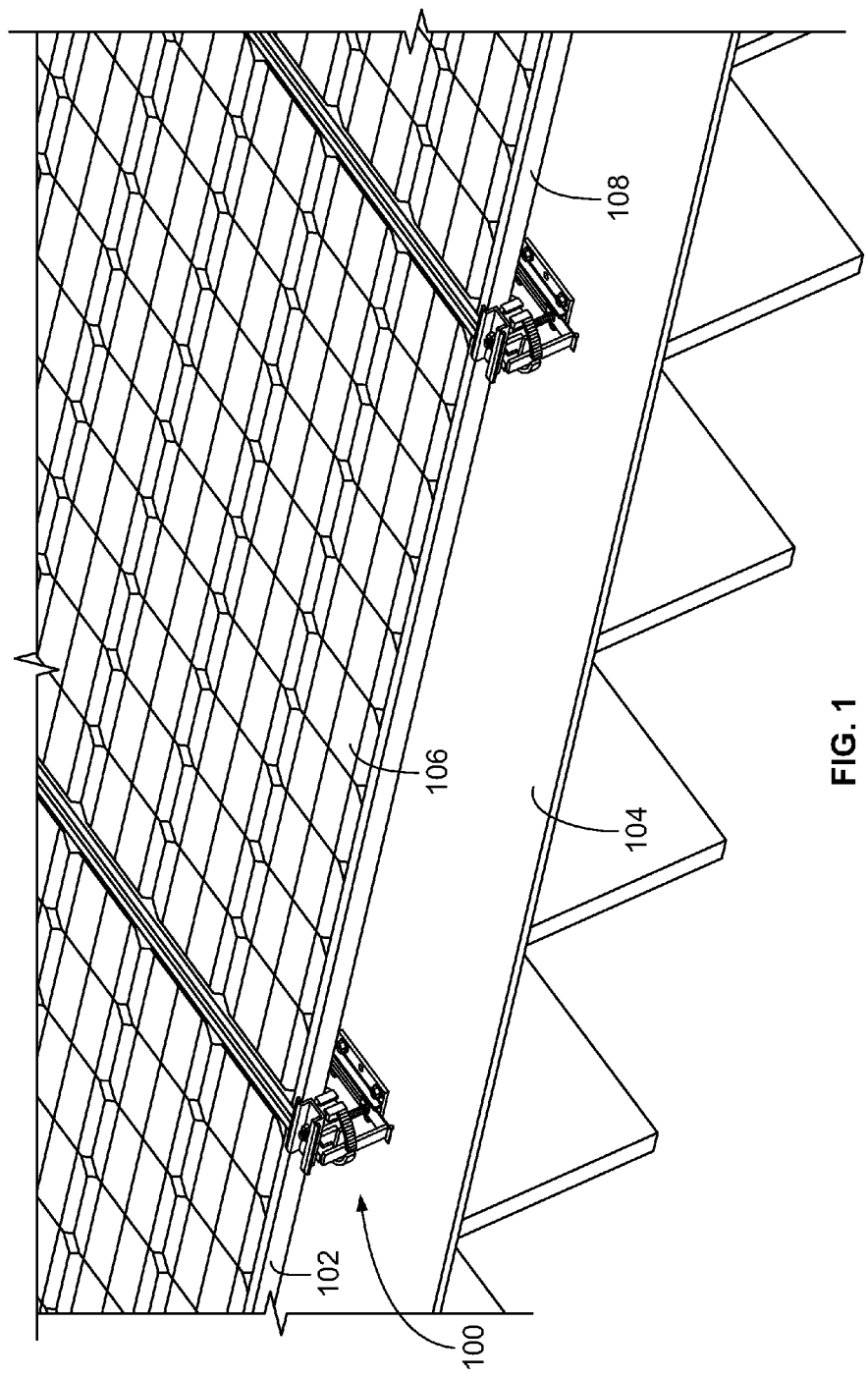
FIG. 1 is an illustration of an example mounting assembly.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, an example mounting assembly 100 is illustrated. The mounting assembly 100 can be used for mounting one or more solar panels 102 to a surface 104. In an example, the surface 104 may comprise a roof, the ground, a support structure, or the like. The mounting assembly 100 can support one or more solar panels 102, such as four solar panels 102, for example. In an example, the mounting assembly 100 can support corners of four solar panels 102. While the illustrated example illustrates a total of three solar panels (e.g., 102, 106, 108), any number of solar panels are contemplated. In an example, the mounting assembly 100 can support the solar panels 102, 106, 108 a distance away from the surface 104, such that components and/or structures may be located between the surface 104 and the solar panels 102, 106, 108.

Figure 2:
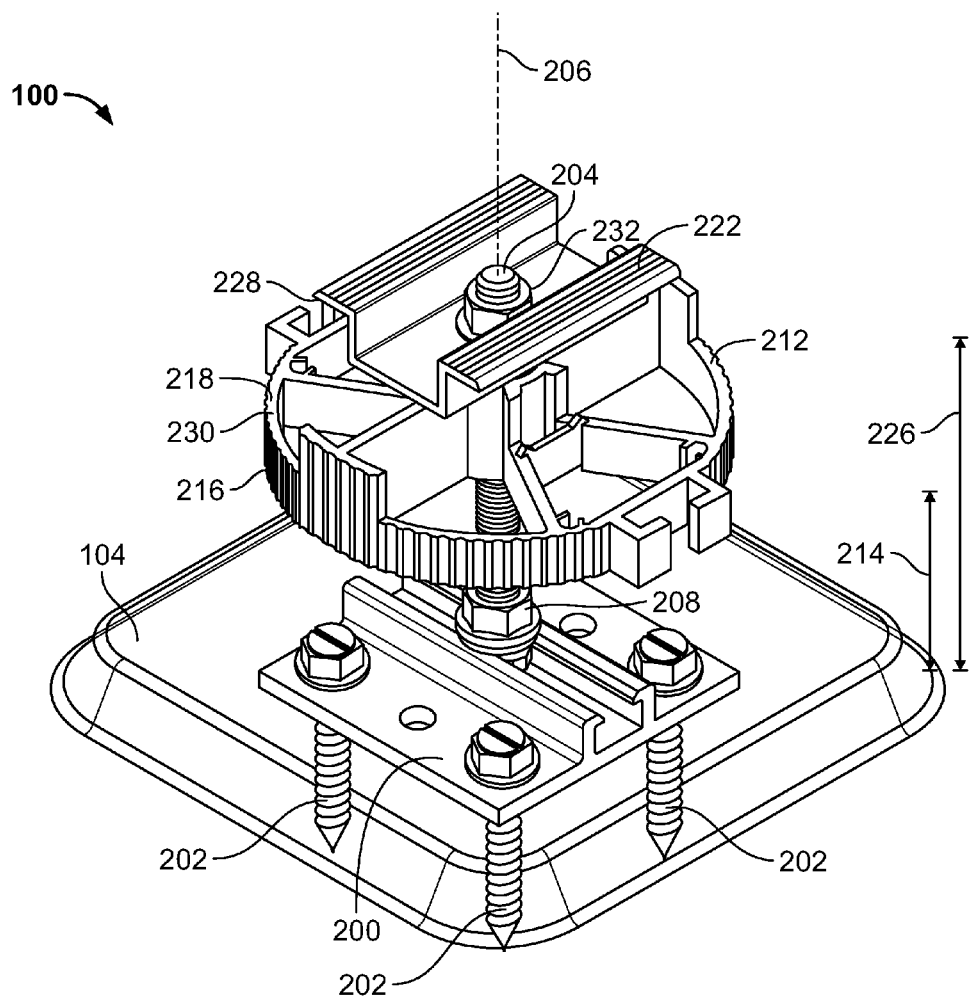
FIG. 2 is an illustration of a portion of an example mounting assembly.

Turning to FIG. 2, an example of the mounting assembly 100 is illustrated. The mounting assembly 100 may comprise a mounting base 200 that is configured to be coupled to the surface 104. By being configured to be coupled to the surface 104, it will be appreciated that the mounting base 200 can be attached to and/or detached from the surface 104. The mounting base 200 can be attached to the surface 104 in any number of ways, such as with one or more base fasteners 202. In such an example, the base fasteners 202 can extend through apertures in the mounting base 200, with the base fasteners 202 extending at least partially into the surface 104. The base fasteners 202 can be selectively loosened and/or removed, such that the mounting base 200 can be removed from the surface 104.

The mounting base 200 is configured to support a fastener 204 that extends along a fastener axis 206. In an example, the fastener axis 206 may be substantially perpendicular to a plane within which the surface 104 lies. The fastener axis 206 may likewise be substantially perpendicular to a plane within which the mounting base 200 lies. In an example, the fastener 204 may be supported by the mounting base 200 such that the fastener 204 is substantially inhibited from moving along the fastener axis 206. However, the fastener 204 can move with respect to the mounting base 200 in a direction that is substantially perpendicular to the fastener axis 206. In an example, a first attachment structure 208 (e.g., a nut, a washer, etc.) can be used to assist in securing the fastener 204 with respect to the mounting base 200. For example, a head of the fastener 204 can be positioned within a channel defined within the mounting base 200, with the head being substantially non-removable from the channel.

The mounting assembly 100 comprises a module mount 212. The module mount 212 can define a module mount opening through which the fastener 204 is received. In an example, the module mount 212 is configured to be movable with respect to the fastener 204 along the fastener axis 206 when the fastener 204 is received through the module mount opening. As such, a first distance 214 between a bottom surface 216 of the module mount 212 and a top surface 218 of the mounting base 200 is adjustable.

The mounting assembly 100 comprises a mounting clamp 222. The mounting clamp 222 can define a mounting clamp opening through which the fastener 204 is received. In an example, the mounting clamp 222 is configured to be movable with respect to the fastener 204 along the fastener axis 206 when the fastener 204 is received through the mounting clamp opening. As such, a second distance 226 between a bottom surface 228 of the mounting clamp 222 and a top surface 230 of the module mount 212 is adjustable.

In this example, the solar panel 102 can be mounted between the bottom surface 216 of the mounting clamp 222 and the top surface 230 of the module mount 212. Due to the second distance 226 being adjustable, the mounting clamp 222 and the module mount 212 can accommodate different sizes of solar panels 102. In this example, a second attachment structure 232 may be provided above the mounting clamp 222, and may be attached to the fastener 204. The second attachment structure 232 can limit inadvertent upward displacement/movement of the mounting clamp 222 with respect to the fastener 204.

Figure 3:
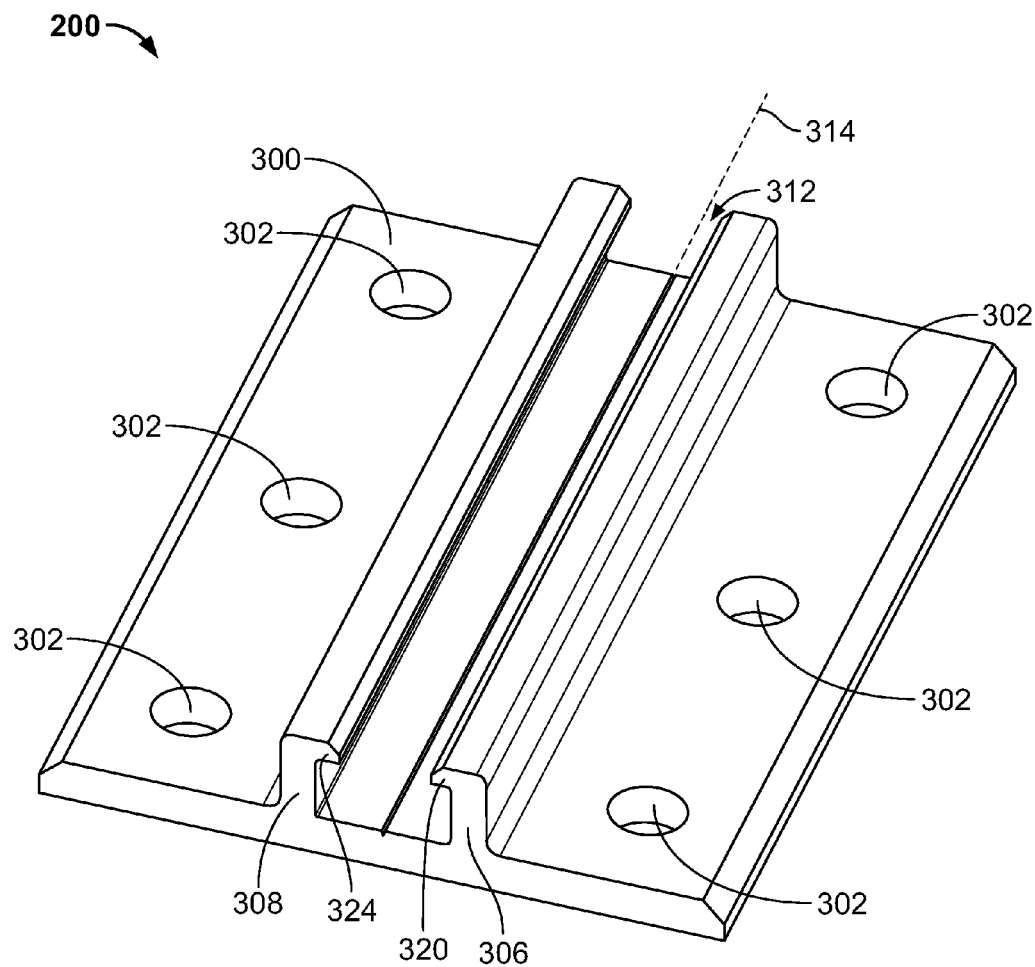
FIG. 3 is an illustration of a portion of an example mounting assembly.

Turning to FIG. 3, an example of the mounting base 200 is illustrated. The mounting base 200 comprises a surface wall 300 that is configured to be coupled to the surface 104. In an example, the surface wall 300 is substantially planar and extends substantially parallel to the surface 104. As such, the surface wall 300 can be substantially flush with the surface 104. In an example, the surface wall 300 can define one or more apertures 302 through which the base fasteners 202 are received.

The mounting base 200 comprises a mounting base sidewall 306 that is coupled to the surface wall 300. The mounting base sidewall 306 can extend in a direction that is substantially perpendicular to the surface wall 300. In an example, the mounting base sidewall 306 extends outwardly from the surface wall 300 on an opposite side of the surface wall 300 from the surface 104. The mounting base sidewall 306 can extend partially between opposing ends of the surface wall 300 or, as illustrated, from one end to an opposing end of the surface wall 300.

The mounting base 200 comprises a second mounting base sidewall 308 that is coupled to the surface wall 300. The second mounting base sidewall 308 can extend in a direction that is substantially perpendicular to the surface wall 300. In an example, the second mounting base sidewall 308 extends outwardly from the surface wall 300 on an opposite side of the surface wall 300 from the surface 104. The second mounting base sidewall 308 can extend partially between opposing ends of the surface wall 300 or, as illustrated, from one end to an opposing end of the surface wall 300.

The mounting base sidewall 306 and the second mounting base sidewall 308 can be spaced a distance apart to define a mounting base channel 312. In this example, the mounting base sidewall 306 and the second mounting base sidewall 308 can define the mounting base channel 312 that extends along a mounting base channel axis 314. The mounting base 200 is configured to receive the fastener 204 within the mounting base channel 312. In an example, the fastener 204 may be movable within the mounting base channel 312 along the mounting channel axis 314.

The mounting base sidewall 306 comprises an attachment ledge 320 that projects towards the mounting base channel 312 along a direction that is substantially parallel to the surface wall 300. In this example, the attachment ledge 320 can project towards a center of the surface wall 300 and towards the second mounting base sidewall 308. The attachment ledge 320 can be located at an opposite end of the mounting base sidewall 306 from where the mounting base sidewall 306 is coupled to the surface wall 300.

The second mounting base sidewall 308 comprises a second attachment ledge 324 that projects towards the mounting base channel 312 along a direction that is substantially parallel to the surface wall 300. In this example, the second attachment ledge 324 can project towards a center of the surface wall 300 and towards the mounting base sidewall 306. The second attachment ledge 324 can be located at an opposite end of the second mounting base sidewall 308 from where the second mounting base sidewall 308 is coupled to the surface wall 300. In this example, a distance separating the attachment ledge 320 and the second attachment ledge 324 may be less than a distance separating the mounting base sidewall 306 and the second mounting base sidewall 308. As such, the attachment ledge 320 and the second attachment ledge 324 can define a reduced width of the mounting base channel 312 opposite the surface wall 300. A head of the fastener 204 can be received within the mounting base channel 312, wherein the head of the fastener 204 has a cross-sectional size that is larger than the distance separating the attachment ledge 320 and the second attachment ledge 324. As such, the attachment ledge 320 and the second attachment ledge 324 can function to retain the head of the fastener 204 within the mounting base channel 312.

Figure 4:
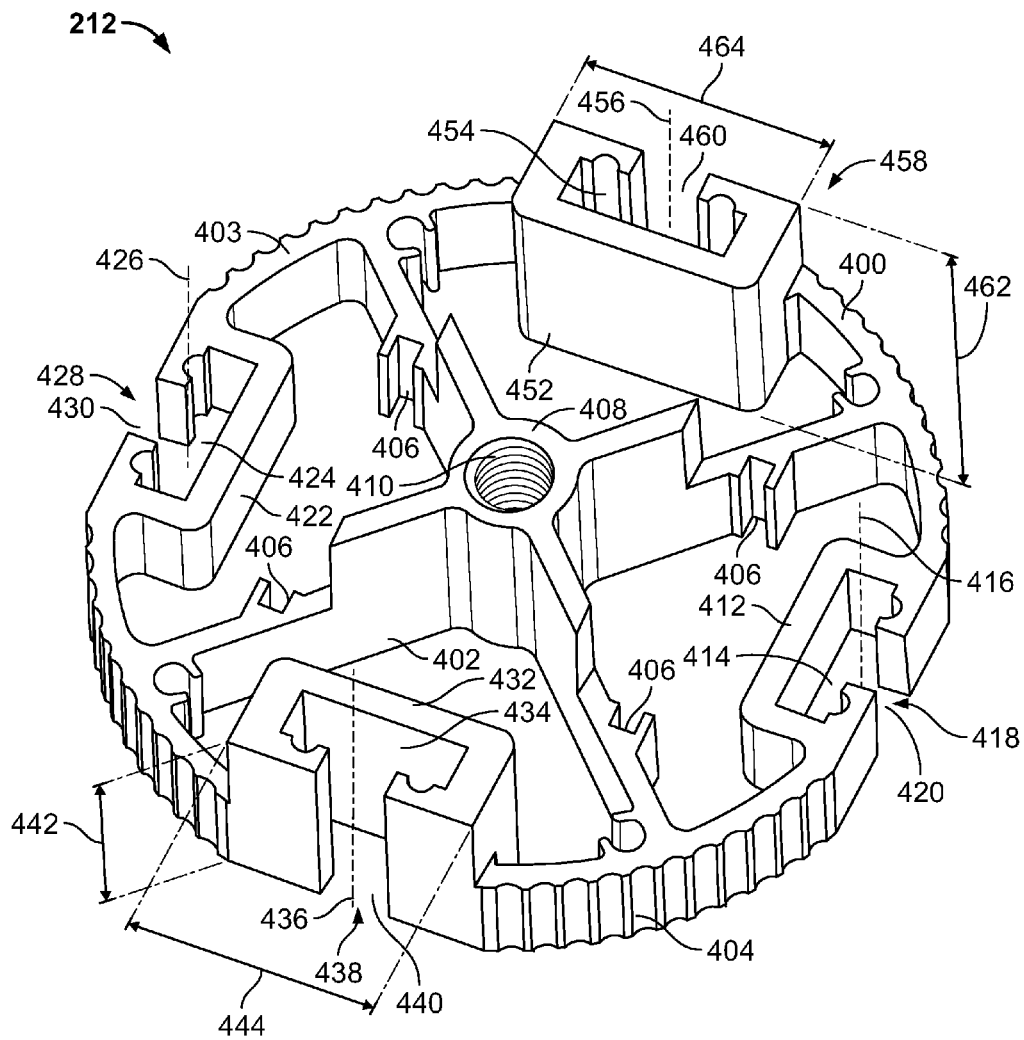
FIG. 4 is an illustration of a portion of an example mounting assembly.

Turning to FIG. 4, an example of the module mount 212 is illustrated. The module mount 212 comprises a body 400 that is configured to be coupled to the fastener 204. The body 400 comprises one or more support sidewalls 402. The one or more support sidewalls 402 can extend radially between a center of the body 400 and an outer circumference of the body 400. In an example, the body 400 comprises an outer radial sidewall 403 that extends circumferentially around the support sidewalls 402. The outer radial sidewall 403 can have a substantially circular shape, though other shapes (e.g., square shapes, rectangular shapes, oval shapes, etc.) are envisioned. In an example, the outer radial sidewall 403 can have one or more ridges 404 on an outer radial side to increase friction and/or gripping between a user's hand and the module mount 212. In an example, the support sidewalls 402 can define one or more grounding slots 406 that can support a grounding clip. The grounding clip can function to electrically ground a conductor that is supported by the mounting assembly 100.

The module mount 212 has a module mount sidewall 408 that defines a module mount opening 410 through which the fastener 204 is received. The module mount sidewall 408 can be positioned towards a center of the body 400. As such, the support sidewalls 402 can extend between the module mount sidewall 408 and the outer radial sidewall 403. In an example, the module mount sidewall 408 that defines the module mount opening 410 may be threaded. As such, the fastener 204 and the module mount sidewall 408 can threadingly engage, such that the module mount 212 can move with respect to the fastener 204. That is, in an example, the module mount 212 can be rotated with respect to the fastener 204, such that the module mount 212 can move along the fastener axis 206 (e.g., in a direction closer to or further from the mounting base 200). As such, the module mount 212 is configured to be movable with respect to the fastener 204 along the fastener axis The module mount 212 can have a second module mount sidewall 412 that defines a locking opening 414 extending along a locking opening axis 416 that is substantially parallel to the fastener axis 206. In an example, the locking opening 414 may be defined at an outer radial location 418 of the module mount 212. The second module mount sidewall 412 can define a slot 420 that is formed at an outer radial side of the locking opening 414.

The module mount 212 can have a third module mount sidewall 422 that defines a second locking opening 424 extending along a second locking opening axis 426 that is substantially parallel to the fastener axis 206. In an example, the second locking opening 424 may be defined at a second outer radial location 428 of the module mount 212. The third module mount sidewall 422 can define a slot 430 that is formed at an outer radial side of the second locking opening 424. In this example, the second outer radial location 428 of the module mount 212 is between about 170 degrees to about 190 degrees from the outer radial location 418 of the locking opening 414.

The module mount 212 can have a fourth module mount sidewall 432 that defines a third locking opening 434 extending along a third locking opening axis 436 that is substantially parallel to the fastener axis 206. In an example, the third locking opening 434 may be defined at a third outer radial location 438 of the module mount 212. The fourth module mount sidewall 432 can define a slot 440 that is formed at an outer radial side of the third locking opening 434. In this example, the third outer radial location 438 of the module mount 212 is between about 80 degrees to about 100 degrees from the outer radial location 418 of the locking opening 414. In an example, the fourth module mount sidewall 432 can have a third height 442 and a third length 444. The third height 442 may be larger than a height of the support sidewalls 402 and/or the outer radial sidewall 403.

The module mount 212 can have a fifth module mount sidewall 452 that defines a fourth locking opening 454 extending along a fourth locking opening axis 456 that is substantially parallel to the fastener axis 206. In an example, the fourth locking opening 454 may be defined at a fourth outer radial location 458 of the module mount 212. The fifth module mount sidewall 452 can define a slot 460 that is formed at an outer radial side of the third locking opening 434. In this example, the fourth outer radial location 458 of the module mount 212 is between about 80 degrees to about 100 degrees from the outer radial location 418 of the locking opening 414. The fourth outer radial location 458 of the module mount 212 may be between about 170 degrees to about 190 degrees from the third outer radial location 438 of the third locking opening 434. In an example, the fourth module mount sidewall 432 can have a fourth height 462 and a fourth length 464. The fourth height 462 may be larger than a height of the support sidewalls 402 and/or the outer radial sidewall 403. In an example, the third height 442 may be substantially similar to the fourth height 462. In an example, the third length 444 may be substantially similar to the fourth length 464.

Figure 5:
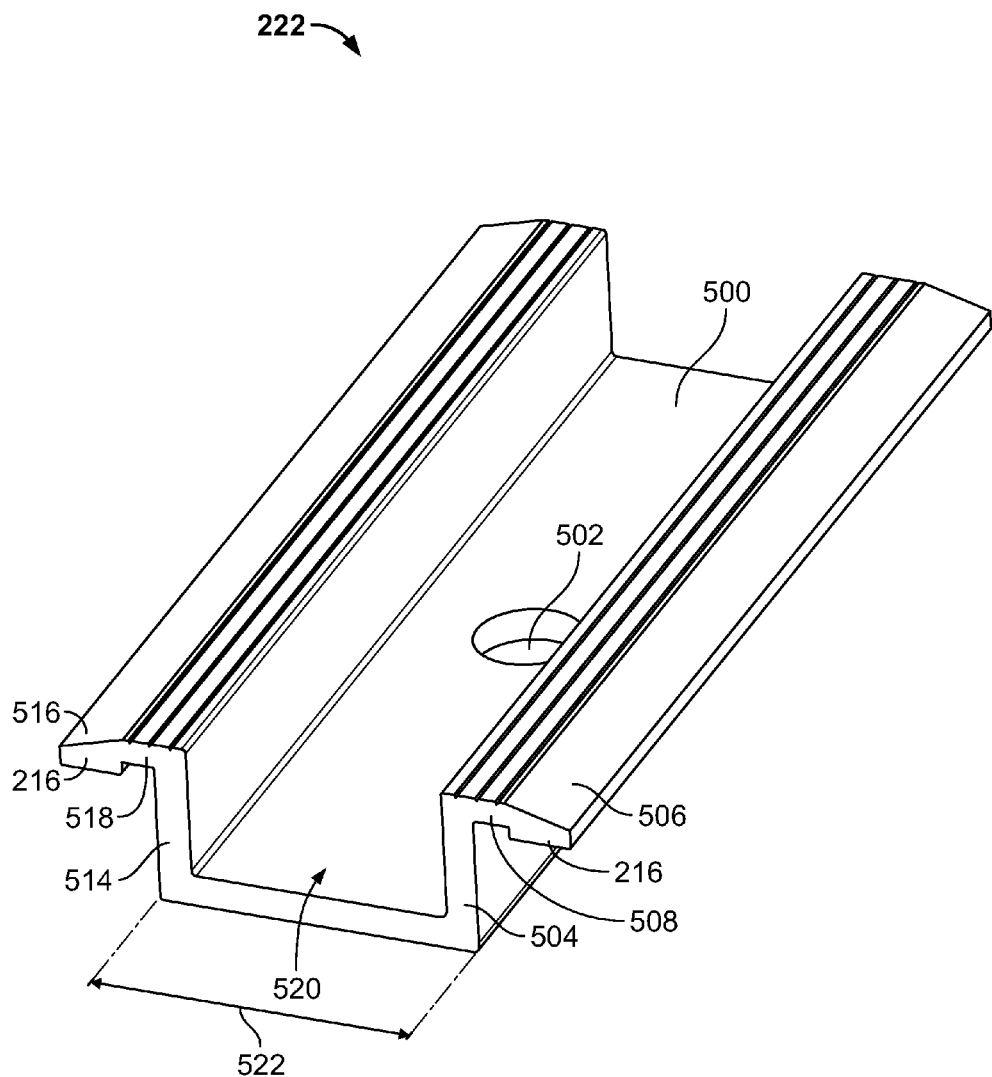
FIG. 5 is an illustration of a portion of an example mounting assembly.

Turning to FIG. 5, an example of the mounting clamp 222 is illustrated. The mounting clamp 222 comprises a mounting clamp sidewall 500. The mounting clamp sidewall 500 can define a mounting clamp opening 502 through which the fastener is received. In some examples, the mounting clamp sidewall 500 defining the mounting clamp opening 502 may be threaded, such that the fastener 204 and the mounting clamp sidewall 500 can threadingly engage. In the illustrated example, the mounting clamp sidewall 500 may not be threaded and the mounting clamp opening 502 may have a larger diameter than a diameter of the fastener 204. In such an example, the mounting clamp 222 can move with respect to the fastener 204 along the fastener axis 206. In an example, the mounting clamp 222 can be positioned to extend substantially parallel to the module mount 212 and to the surface wall 300 of the mounting base 200.

The mounting clamp 222 comprises a mounting sidewall 504 and a mounting ledge 506. In an example, the mounting sidewall 504 can extend along a direction that is substantially perpendicular to the mounting clamp sidewall 500. The mounting sidewall 504 can be coupled to the mounting clamp sidewall 500. The mounting clamp 222 can be positioned such that when the fastener 204 is received through the mounting clamp opening 502, the module mount 212 is positioned on a first side of the mounting clamp sidewall 500 and the mounting sidewall 504 is positioned on an opposing second side of the mounting clamp sidewall 500.

The mounting ledge 506 may be coupled to the mounting sidewall 504 at an opposite end of the mounting sidewall 504 from the mounting clamp sidewall 500. The mounting ledge 506 can extend substantially parallel to the plane within which the surface 104 lies. In this example, the mounting ledge 506 can extend substantially perpendicular to the mounting sidewall 504 and substantially parallel to the mounting clamp sidewall 500. The mounting ledge 506 can define a groove 508 along the bottom surface 216 of the mounting ledge 506. The groove 508 can accommodate a support structure such that the mounting clamp 222 is limited from inadvertently tipping/rotating side to side. In an example, the second distance 226 can be measured between the bottom surface 216 of the mounting ledge 506 and the top surface 218 of the module mount 212.

The mounting clamp 222 comprises a second mounting sidewall 514 and a second mounting ledge 516. In an example, the second mounting sidewall 514 can extend along a direction that is substantially perpendicular to the mounting clamp sidewall 500. The second mounting sidewall 514 can be coupled to the mounting clamp sidewall 500. The mounting clamp 222 can be positioned such that when the fastener 204 is received through the mounting clamp opening 502, the module mount 212 is positioned on the first side of the mounting clamp sidewall 500 and the second mounting sidewall 514 is positioned on the opposing second side of the mounting clamp sidewall 500.

The second mounting ledge 516 may be attached to the second mounting sidewall 514 at an opposite end of the second mounting sidewall 514 from the mounting clamp sidewall 500. The second mounting ledge 516 can extend substantially parallel to the plane within which the surface 104 lies. In this example, the second mounting ledge 516 can extend substantially perpendicular to the second mounting sidewall 514 and substantially parallel to the mounting clamp sidewall 500. The second mounting ledge 516 can define a second groove 518 along the bottom surface 216 of the second mounting ledge 516. In an example, the second distance 226 can be measured between the bottom surface 216 of the second mounting ledge 516 and the top surface 218 of the module mount 212.

The mounting clamp sidewall 500 can be attached to the mounting sidewall 504 along one edge, and to the second mounting sidewall 514 along an opposing edge. In this example, the mounting clamp sidewall 500, the mounting sidewall 504, and the second mounting sidewall 514 can define a mounting clamp channel 520. The mounting clamp sidewall 500 can have a mounting length 522 as measured between the mounting sidewall 504 and the second mounting sidewall 514. In an example, the mounting length 522 can be substantially similar to the third length 444 of the fourth module mount sidewall 432 and/or the fourth length 464 of the fifth module mount sidewall 452.

Figure 6:
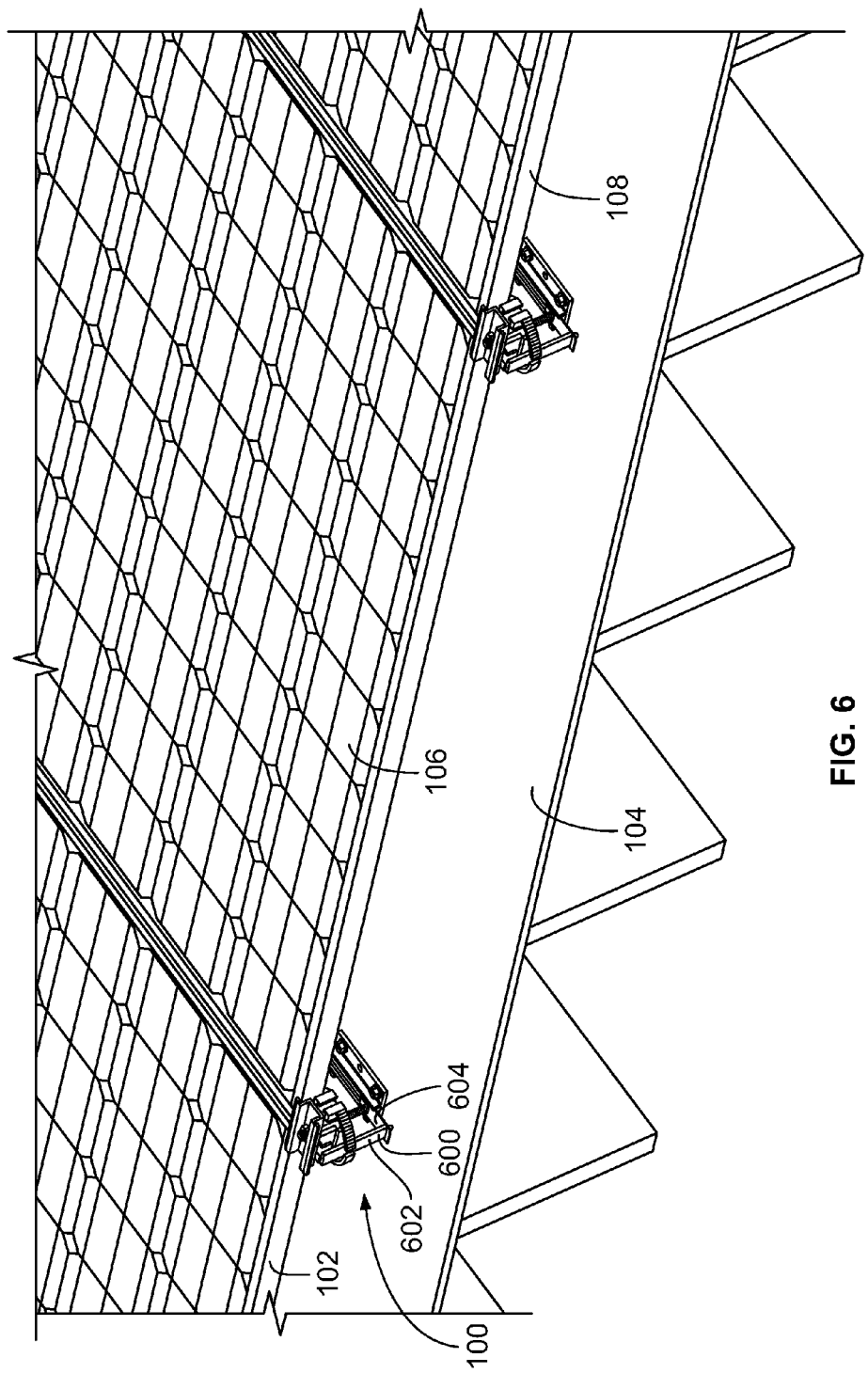
FIG. 6 is an illustration of an example mounting assembly.

Turning to FIG. 6, a locking structure 600 can be provided to inhibit rotation of the module mount 212 with respect to the mounting base 200. The locking structure 600 may comprise a substantially rigid structure that may be formed of plastic, metal, composites, or the like. In an example, the locking structure 600 is configured to be received through the locking opening 414 of the module mount 212. It will be appreciated that the locking structure 600 is not limited to being received through the locking opening 414, and in other examples, may be received through the second locking opening 424, the third locking opening 434, or the fourth locking opening 454.

The locking structure 600 is configured to be coupled to the mounting base 200 to inhibit rotation of the module mount 212 with respect to the mounting base 200. In an example, the locking structure 600 can be received within the mounting base channel 312 of the mounting base 200 to inhibit rotation of the module mount 212 with respect to the mounting base 200.

The locking structure 600 comprises a first locking portion 602 and a second locking portion 604. The first locking portion 602 can extend substantially non-linearly with respect to the second locking portion 604. In an example, an angle can be defined between the first locking portion 602 and the second locking portion 604 that is between about 70 degrees to about 110 degrees. In such an example, the angle may be about 90 degrees between the first locking portion 602 and the second locking portion 604.

The first locking portion 602 of the locking structure 600 is configured to be received through the locking opening 414 of the module mount 212. In an example, the slot 420 can allow for the first locking portion 602 to be inserted into and/or removed from the locking opening 414. For example, the slot 420 has a width that is larger than a width of the first locking portion 602, such that the first locking portion 602 can pass through the slot 420. In another example, the first locking portion 602 can be inserted into and/or removed from the locking opening 414 from underneath the locking opening 414, such that the slot 420 may not be used. In these examples, the first locking portion 602 can have a cross-sectional size and shape (e.g., rectangular) that substantially matches a cross-sectional size and shape (e.g., rectangular) of the locking opening 414.

The second locking portion 604 of the locking structure 600 is configured to be coupled to the mounting base 200. In an example, the second locking portion 604 can be received within the mounting base channel 312 of the mounting base 200. In this example, the second locking portion 604 can have a cross-sectional size and shape (e.g., rectangular) that substantially matches a cross-sectional size and shape (e.g., rectangular) of the mounting base channel 312. In some examples, an end of the second locking portion 604 opposite the first locking portion 602 can define an opening (e.g., a channel, a groove, etc.). This opening can be sized to receive at least a portion of the fastener 204.

The locking structure 600 can inhibit rotation of the module mount 212 with respect to the mounting base 200. For example, the first locking portion 602 may be received through the locking opening 414 while the second locking portion 604 may be coupled to the mounting base 200. The locking structure 600 may therefore limit the module mount 212 from rotating with respect to the fastener 204. Since the module mount 212 is limited from rotating with respect to the fastener 204, the module mount 212 may likewise be limited from rotating with respect to the mounting base 200.

Figure 7:
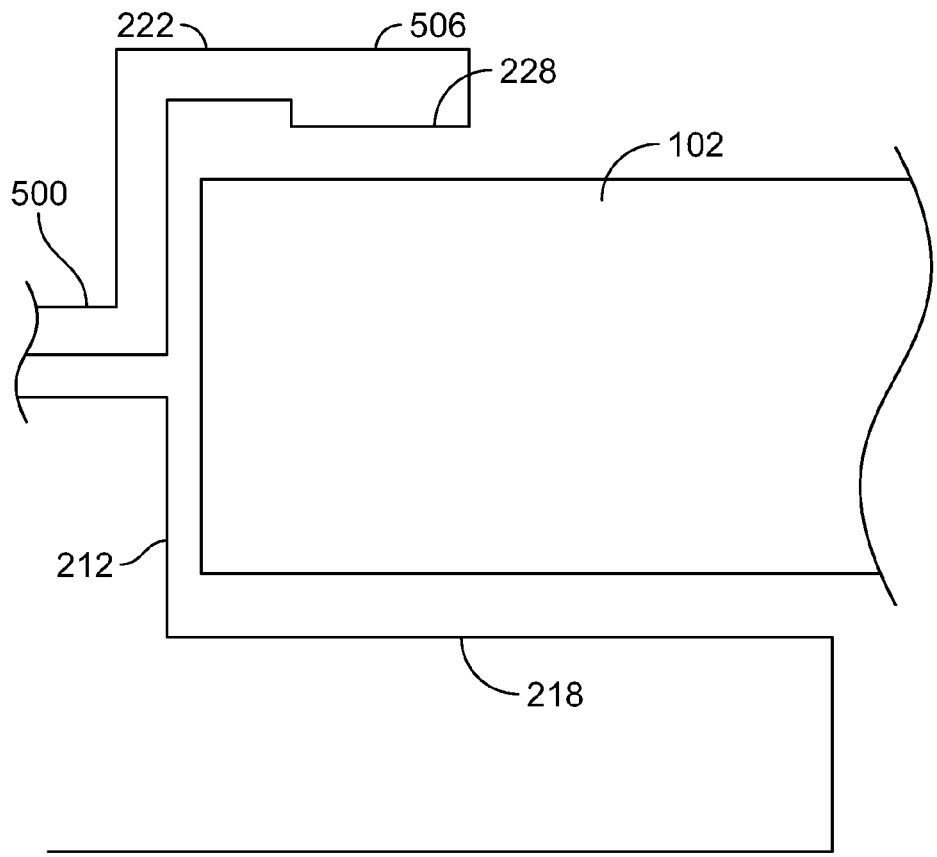
FIG. 7 is an illustration of a portion of an example mounting assembly.

Referring to FIGS. 6 and 7, when the locking structure 600 inhibits rotation of the module mount 212 with respect to the mounting base 200, attachment of the solar panels 102 with respect to the mounting assembly 100 is facilitated. For example, the locking structure 600 can maintain the module mount 212 in a relatively static position when the mounting assembly 100 is attached to the surface 104. With the module mount 212 in place, the solar panels 102, 106, 108 can be attached with respect to the mounting assembly 100.

FIG. 7 illustrates a side view of the solar panels 102, 106, 108 positioned between the module mount 212 and the mounting clamp 222. For example, the solar panels 102, 106, 108 can be positioned between the top surface 218 of the module mount 212 and the bottom surface 228 of the mounting ledge 506 of the mounting clamp 222. The solar panels 102, 106, 108 can rest upon the top surface 218 of the module mount 212. To allow for adjustment of the mounting clamp 222, the locking structure 600 can be removed. For example, the first locking portion 602 can be removed from the locking opening 414 of the module mount 212 while the second locking portion 604 can be de-coupled and separated from the mounting base 200.

With the locking structure 600 removed, the mounting clamp 222 can be tightened onto the solar panels 102, 106, 108. In an example, the second attachment structure 232 can be rotated and tightened onto the fastener 204, such that the second attachment structure 232 applies a downward force to the mounting clamp 222. This downward force can cause the bottom surface 228 of the mounting clamp 222 to contact an upper surface of the solar panels 102, 106, 108. As such, the solar panels 102, 106, 108 may be compressed between the module mount 212 (e.g., along a bottom of the solar panels 102, 106, 108) and the mounting clamp 222 (e.g., along a top of the solar panels 102, 106, 108).

It will be appreciated that while the example of FIGS. 6 and 7 illustrate the mounting assembly 100 supporting two solar panels (e.g., 102, 106), the mounting assembly 100 is not so limited. For example, in FIGS. 6 and 7, a corner of the solar panel 102 and a corner of the second solar panel 106 may be supported by the mounting assembly 100 below the mounting ledge 506. After the locking structure 600 is removed, corners of two solar panels may be supported by the mounting assembly 100 below the second mounting ledge 516 on an opposite side of the mounting clamp 222. As such, the mounting assembly 100 can support up to four solar panels, with two solar panels (e.g., 102, 106) on one side of the mounting clamp 222 and two solar panels on an opposite side of the mounting clamp 222.

The mounting assembly 100 is beneficial in a number of ways. For example, the fastener 204 allows for different portions of the mounting assembly 100 to be adjusted with respect to the surface 104. For example, the module mount 212 can be rotated with respect to the fastener 204 to adjust a distance between the module mount 212 and the mounting base 200. Likewise, in an example, the mounting clamp 222 can be moved with respect to the fastener 204 (e.g., upwardly or downwardly) to adjust the distance between the fastener 204 and the mounting base 200 and/or the module mount 212. Due to the adjustability of the mounting clamp 222 with respect to the module mount 212, the mounting assembly 100 can accommodate solar panels of different thicknesses.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A mounting assembly for mounting a solar panel to a surface, the mounting assembly comprising:
 a mounting base configured to be coupled to the surface, the mounting base configured to support a fastener that extends along a fastener axis;
 a module mount having a threaded module mount sidewall defining a module mount opening through which the fastener is threadingly received, the module mount configured to be movable with respect to the fastener along the fastener axis when the fastener is received through the module mount opening such that a first distance between a bottom surface of the module mount and a top surface of the mounting base is adjustable, the bottom surface of the module mount not in contact with the top surface of the mounting base, the module mount having a second module mount sidewall defining a locking opening extending along a locking opening axis that is substantially parallel to the fastener axis, the locking opening defined at an outer radial location of the module mount, the module mount having a third module mount sidewall defining a second locking opening extending along a second locking opening axis that is substantially parallel to the fastener axis, the second locking opening defined at a second outer radial location of the module mount that is between about 170 degrees to about 190 degrees from the outer radial location of the locking opening; and a mounting clamp having a mounting clamp sidewall defining a mounting clamp opening through which the fastener is received, the mounting clamp configured to be movable with respect to the fastener along the fastener axis when the fastener is received through the mounting clamp opening such that a second distance between a bottom surface of the mounting clamp and a top surface of the module mount is adjustable, the solar panel mounted between the bottom surface of the mounting clamp and the top surface of the module mount, wherein the module mount is coupled to the fastener at a first fastener location along the fastener axis and the mounting clamp is coupled to the fastener at a second fastener location along the fastener axis.

2. The mounting assembly of claim 1, wherein the fastener axis is substantially perpendicular to a plane within which the surface lies.

3. The mounting assembly of claim 2, wherein the mounting clamp comprises a mounting sidewall and a mounting ledge, the mounting ledge attached to the mounting sidewall and extending substantially parallel to the plane within which the surface lies.

4. The mounting assembly of claim 3, wherein the second distance is measured between the bottom surface of the mounting ledge and the top surface of the module mount.

5. The mounting assembly of claim 3, wherein the mounting clamp comprises a second mounting sidewall and a second mounting ledge, the second mounting ledge attached to the second mounting sidewall and extending substantially parallel to the plane within which the surface lies.

6. The mounting assembly of claim 5, wherein the mounting clamp sidewall is attached to the mounting sidewall and the second mounting sidewall, the mounting clamp sidewall extending substantially parallel to the mounting ledge.

7. The mounting assembly of claim 1, the module mount having a fourth module mount sidewall defining a third locking opening extending along a third locking opening axis that is substantially parallel to the fastener axis, the third locking opening defined at a third outer radial location of the module mount that is between about 80 degrees to about 100 degrees from the outer radial location of the locking opening.

8. The mounting assembly of claim 7, the module mount having a fifth module mount sidewall defining a fourth locking opening extending along a fourth locking opening axis that is substantially parallel to the fastener axis, the fourth locking opening defined at a fourth outer radial location of the module mount that is between about 170 degrees to about 190 degrees from the third outer radial location of the third locking opening.

9. A mounting assembly for mounting a solar panel to a surface, the mounting assembly comprising:

a mounting base configured to be coupled to the surface, the mounting base having a mounting base sidewall defining a mounting base channel extending along a mounting base channel axis, the mounting base configured to receive a fastener within the mounting base channel, the fastener movable within the mounting base channel along the mounting base channel axis, the fastener extending along a fastener axis that is non-parallel to the mounting base channel axis;

a module mount having a module mount sidewall defining a module mount opening through which the fastener is received, the module mount configured to be movable with respect to the fastener along the fastener axis when the fastener is received through the module mount opening such that a first distance between a bottom surface of the module mount and a top surface of the mounting base is adjustable, the module mount having a top surface wherein a first portion of the top surface of the module mount is a first mounting distance from the top surface of the mounting base and a second portion of the top surface of the module mount is a second mounting distance from the top surface of the mounting base, the first mounting distance less than the second mounting distance, the second portion of the top surface lying within a top surface plane; and a mounting clamp having a mounting clamp sidewall defining a mounting clamp opening through which the fastener is received, the mounting clamp configured to be movable with respect to the fastener along the fastener axis when the fastener is received through the mounting clamp opening such that a second distance between a bottom surface of the mounting clamp and the top surface of the module mount is adjustable, the solar panel mounted between the bottom surface of the mounting clamp and the first portion of the top surface of the module mount and adjacent a second module mount sidewall extending from the first portion of the top surface of the module mount to the second portion of the top surface of the module mount, the second module mount sidewall configured to engage the solar panel and inhibit movement of the module mount with respect to the mounting base;

wherein the mounting clamp is not intersected by the top surface plane.

10. The mounting assembly of claim 9, the mounting base having a surface wall configured to be coupled to the surface, the mounting base sidewall coupled to the surface wall and extending in a direction that is substantially perpendicular to the surface wall.

11. The mounting assembly of claim 10, the mounting base having a second mounting base sidewall coupled to the surface wall and extending in a direction that is substantially perpendicular to the surface wall.

12. The mounting assembly of claim 11, the second mount base sidewall spaced a distance apart from the mounting based sidewall and defining the mounting base channel.

13. The mounting assembly of claim 12, the mounting base sidewall comprising an attachment ledge that projects towards the mounting base channel along a direction that is substantially parallel to the surface wall.

14. The mounting assembly of claim 13, the second mounting base sidewall comprising a second attachment ledge that projects towards the mounting base channel along a direction that is substantially parallel to the surface wall.

15. A mounting assembly for mounting a solar panel to a surface, the mounting assembly comprising:

a mounting base configured to be coupled to the surface, the mounting base configured to support a fastener that extends along a fastener axis;

a module mount having a first module mount sidewall defining a module mount opening through which the fastener is received, the module mount configured to be movable with respect to the fastener along the fastener axis when the fastener is received through the module mount opening such that a first distance between a bottom surface of the module mount and a top surface of the mounting base is adjustable, the module mount having a second module mount sidewall defining a locking opening extending along a locking opening axis that is substantially parallel to the fastener axis;

a mounting clamp having a mounting clamp sidewall defining a mounting clamp opening through which the fastener is received, the mounting clamp configured to be movable with respect to the fastener along the fastener axis when the fastener is received through the mounting clamp opening such that a second distance between a bottom surface of the mounting clamp and a top surface of the module mount is adjustable, the solar panel mounted between the bottom surface of the mounting clamp and the top surface of the module mount; and a locking structure configured to be received through the locking opening of the module mount, the locking structure configured to be coupled to the mounting base to inhibit rotation of the module mount with respect to the mounting base;

wherein the top surface of the module mount faces the mounting clamp and the bottom surface of the module mount faces the mounting base, the locking opening extending through the top surface and the bottom surface.

16. The mounting assembly of claim 15, the mounting base having a mounting base sidewall defining a mounting base channel extending along a mounting base channel axis, the mounting base configured to receive the fastener within the mounting base channel, the fastener movable within the mounting base channel along the mounting base channel axis.

17. The mounting assembly of claim 16, the locking structure received within the mounting base channel to inhibit rotation of the module mount with respect to the mounting base.

18. The mounting assembly of claim 15, the locking structure comprising a first locking portion and a second locking portion, the first locking portion extending substantially non-linearly with respect to the second locking portion, the first locking portion configured to be received through the locking opening of the module mount, the second locking portion configured to be coupled to the mounting base.

19. The mounting assembly of claim 9, the top surface plane perpendicular to the fastener axis.

20. The mounting assembly of claim 9, the second portion of the top surface defining a maximum distance of the module mount from the top surface of the mounting base.

* * * * *